United States Patent
Ahn et al.

(10) Patent No.: US 8,685,526 B2
(45) Date of Patent: Apr. 1, 2014

(54) DECORATING MATERIAL WITH CUBIC EFFECT

(75) Inventors: Kyoungsoo Ahn, Seoul (KR); Kyoungjong Yoo, Seoul (KR); Haesik Kim, Seoul (KR); Sic Hur, Seoul (KR); Sangjun Park, Seoul (KR); Kwangho Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 450 days.

(21) Appl. No.: 12/977,155

(22) Filed: Dec. 23, 2010

(65) Prior Publication Data

US 2011/0159243 A1 Jun. 30, 2011

(30) Foreign Application Priority Data

Dec. 24, 2009 (KR) .................. 10-2009-0131331

(51) Int. Cl.
 *B32B 3/10* (2006.01)
 *B32B 5/14* (2006.01)
 *A47G 35/00* (2006.01)

(52) U.S. Cl.
 USPC ........... 428/161; 428/164; 428/172; 428/201; 428/207; 428/209; 428/542.2; 428/913

(58) Field of Classification Search
 USPC .............. 428/161–164, 201–209, 172, 542.2, 428/913, 913.3
 See application file for complete search history.

(56) References Cited

U.S. PATENT DOCUMENTS 3,338,730 A * 8/1967 Slade et al. .................. 428/142
5,804,285 A * 9/1998 Kobayashi et al. ........... 428/172

FOREIGN PATENT DOCUMENTS

| CN | 1947998 A | 4/2007 |
|---|---|---|
| JP | 58-014312 A | 1/1983 |
| JP | 64-006026 A | 1/1989 |
| JP | 64-035708 A | 2/1989 |
| JP | 05-162277 A | 6/1993 |
| JP | 05-220891 A | 8/1993 |
| JP | 06-087200 A | 3/1994 |
| JP | 06-305063 A | 11/1994 |
| JP | 08-118578 A | 5/1996 |
| JP | 08-142597 A | 6/1996 |
| JP | 11-207864 A | 8/1999 |
| JP | 2001-341498 A | 12/2001 |
| JP | 2002-079628 A | 3/2002 |
| JP | 2002-103515 A | 4/2002 |
| JP | 2002-127694 A | 5/2002 |
| JP | 2005-029735 A | 2/2005 |
| JP | 2005-193400 A | 7/2005 |
| JP | 2009-130365 A | 6/2009 |

OTHER PUBLICATIONS

Office Action dated May 6, 2013 in Chinese Application No. 201010604316.3, filed Dec. 24, 2010.
Office Action dated Jul. 10, 2012 in Japanese Application No. 2010-288528, filed Dec. 24, 2010.
Office Action dated Nov. 22, 2011 in Korean Application No. 10-2009-0131331, filed Dec. 24, 2009.

* cited by examiner

*Primary Examiner* — Donald J Loney
(74) *Attorney, Agent, or Firm* — Saliwanchik, Lloyd & Eisenschenk

(57) ABSTRACT

A decorating material with cubic (3D) effect and a method for manufacturing the same are disclosed, wherein the material includes a resin layer formed on a substrate to have a convexo-concave pattern, a metallic film and a light opaque film sequentially formed on a convex portion or on a concave portion, wherein the convex portion or the concave portion is formed with a light penetration unit through which light is penetrated.

9 Claims, 3 Drawing Sheets

DECORATING MATERIAL WITH CUBIC EFFECT

CROSS-REFERENCE TO RELATED APPLICATION

This application claims the benefit under 35 U.S.C. §119 of Korean Patent Application No. 10-2009-0131331, filed on Dec. 24, 2009, which is hereby incorporated by reference in its entirety.

BACKGROUND OF THE DISCLOSURE

1. Field of the Invention

The present disclosure relates to a decorating material with cubic effect, and more particularly to a decorating material with 3D (cubic) effect capable of implementing various colors that cannot be achieved by metal deposition.

2. Discussion of the Related Art

In general, the decorating material is used for beautifying living quarters and living space and must be able to express aesthetic effect. The decorating material used to widely employ, by way of example, synthetic decorating materials and glass for beautifying exterior or interior of furniture, electric home appliances and electronic products.

The synthetic resin-based decorating material used for synthetic resin sheets, films or panels generally has such a laminated structure in which a decorative sheet having, for example, a printed pattern is bonded onto a surface to provide coloring effects thereon, and is coated with transparent surface layer. The synthetic resin decorating material suffers from disadvantages in that consumers' aesthetic desires are not satisfied due to simple repetition of surface patterns and simple pattern colors.

Furthermore, the related art decorative material has such a laminated structure in which a single metallic layer is deposited on a substrate for imparting a metallic texture, where the substrate is formed with visual convexo-concave feeling for improving the aesthetic purpose.

However, the related art method suffers from disadvantages in that deposition of a single metal on a front surface cannot implement various textures and colors and can provide only the same texture and color even if viewing angles are differentiated.

In implementing a metallic beauty using metals, the physical properties thereof are changed based on types of metals and thickness of metallic layer coated on the surface. That is, if the metallic layer is too thin, the metallic feeling decreases, or if the metallic layer is too thick, the metallic layer chips off or the color inside the pattern thickens to fail to impart the metallic feeling or textures.

FIG. 1 is a cross-sectional view illustrating a decorating material formed with a convexo-concave pattern according to the related art.

Referring to FIG. 1, a metal film 150 formed on the conventional convexo-concave pattern is such that a resin layer 140 is formed at a front surface with a single metal layer. Therefore, there is little difference in gloss or little shade according to where the pattern is viewed, to exhibit a metallic color of a highly dark feeling across the board. Another disadvantage is that there is a large color difference in between a portion where a certain pattern is formed and a portion where a certain pattern is not formed.

BRIEF SUMMARY

The present disclosure is disclosed to solve the aforementioned disadvantages, and it is an object of the present disclosure to provide a decorating material with cubic (3D) effect configured to implement an actual metallic feeling and a 3D pattern by adjusting a formed pattern shape or numeral change and a printed characteristic of a metal paste (or ink) and by using a difference of refraction, transmission and reflectivity, and a method for manufacturing the same.

In one general aspect of the present disclosure, there is provided a decorating material for cubic effect, the material comprising: a resin layer formed on a substrate to have a convexo-concave pattern; a metallic film and a light opaque film sequentially formed on a convex portion or on a concave portion, wherein the convex portion or the concave portion is formed with a light penetration unit through which light is penetrated.

In some exemplary embodiments of the present disclosure, the metallic film and the light opaque film may grow thicker, nearing a center of the convex portion or a center of the concave portion.

In some exemplary embodiments of the present disclosure, the light penetration unit is formed at a margin of the convex portion or the concave portion, wherein the light penetration unit may include a light opaque unit formed with the metallic film or the metallic film and the light opaque film, and a complete light penetration unit not formed with the metallic film and the light opaque film.

In some exemplary embodiments of the present disclosure, the thickness of the metallic film may be 1 μm or above, or less than 10 μm.

In some exemplary embodiments of the present disclosure, the thickness of the light opaque film may be 1 μm or above but less than 15 μm.

In some exemplary embodiments of the present disclosure, the material of the metallic film may include Al, paste and nitrocellulose, carbon black, polyester resin, isocyanate and additive.

In some exemplary embodiments of the present disclosure, the material of the light opaque film may include carbon black, modified (denatured) acryl, polyester resin and additive.

In some exemplary embodiments of the present disclosure, the depth of the convex portion or the concave portion may be 1 μm or above but less than 100 μm, while the pitch may be 1 μm or above but less than 300 μm.

In some exemplary embodiments of the present disclosure, the substrate may be a film or a sheet formed with a material selected from a group consisting of polyethyleneterephthalene, polycarbonate, polyprophylene and polymethamethylacrylate.

In some exemplary embodiments of the present disclosure, the decorating material for cubic effect may further include a glass layer under the substrate laminated with PSA (Pressure Sensitive Adhesive).

In some exemplary embodiments of the present disclosure, the decorating material for cubic effect may further include a light opaque film formed on a plain surface of the resin layer.

In another general aspect of the present disclosure, there is provided a method for manufacturing a decorating material for cubic effect, the method comprising: forming a convexo-concave pattern on a resin layer of a substrate (a); forming a metallic film on a convex portion or on a concave portion of the convexo-concave pattern by coating a metal paste or an ink (b); and forming an light opaque film on the metallic film (c).

In some exemplary embodiments of the present disclosure, the coating step of (c) may comprise coating an opaque ink, laminating an opaque film or an opaque sheet, or coating the opaque ink and laminating the opaque film or the opaque sheet thereon.

In some exemplary embodiments of the present disclosure, the coating step of (b) or the coating step of (c) may comprise using a bar code or a gravure coater.

In some exemplary embodiments of the present disclosure, the coating step of (b) or the coating step of (c) may comprise coating by facing the convexo-concave pattern downward in a case the convex portion of the convexo-concave pattern is coated.

In some exemplary embodiments of the present disclosure, the method may further comprise forming an opaque film on the plain surface of the resin layer (d).

In some exemplary embodiments of the present disclosure, the step of (d) may comprise coating the opaque ink on the plain surface of the resin layer using the gravure coater.

In some exemplary embodiments of the present disclosure, the method may further comprise: coating PSA underneath the substrate (e); and adhering a glass layer underneath the PSA.

BRIEF DESCRIPTION OF THE DRAWINGS

The accompanying drawings, which are included to provide a further understanding of the disclosure and are incorporated in and constitute a part of this application, illustrate exemplary embodiments of the disclosure and together with the description, serve to explain the principle of the disclosure. In the drawings.

DETAILED DESCRIPTION

Figure 1:
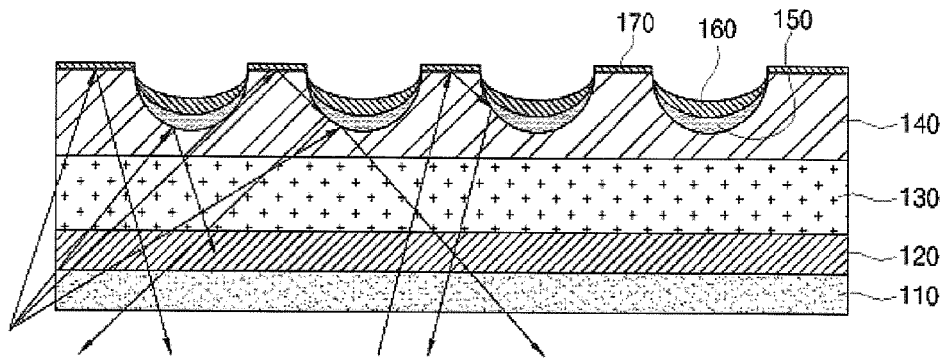
FIG. 1 is a cross-sectional view illustrating a decorating material formed with a convexo-concave pattern according to the related art.

The exemplary embodiments of the present disclosure will be described in detail with reference to the accompanying drawings.

In the drawings, the thickness of layers and regions are exaggerated for clarity. It will also be understood that when an element such as a front surface of a film or a rear surface of a film is referred to as being "on" or "under" another element, it may include all the configurations of the element lying directly or indirectly on the other element or intervening elements. In the drawings, the size and relative sizes of each element may be exaggerated for clarity. Like numbers refer to like elements throughout.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the drawings, the terminology of "on" or "under" of each element is described based on the drawings.

Although the present disclosure has described a convex portion in the convexo-concave pattern, it should be apparent that a concave portion may be also present. That is, the present disclosure may include an engraving in relief and an intaglio (depressed engraving). In the present disclosure, an intaglio is only described for the convenience sake.

Figure 2:
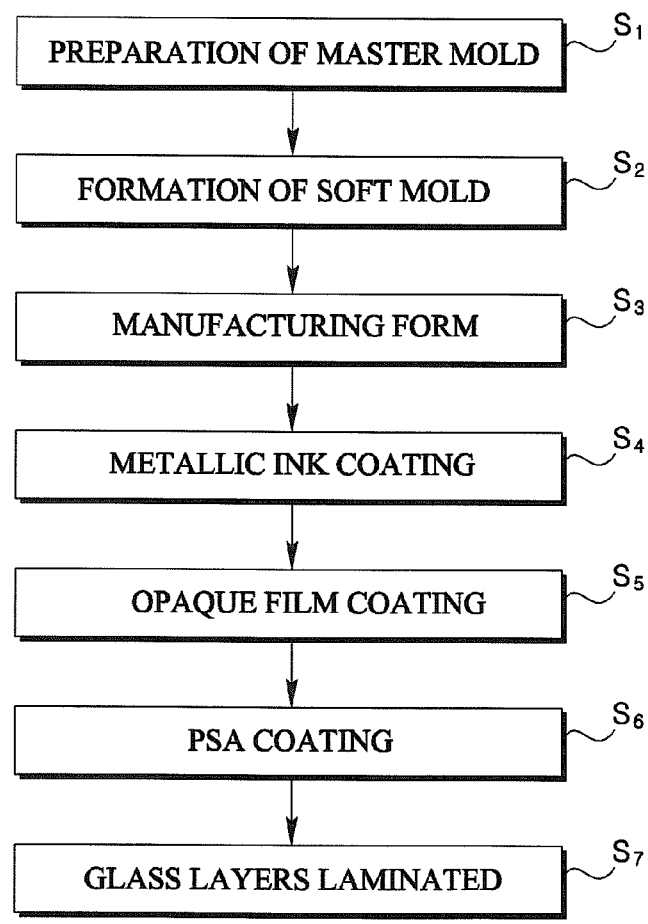
FIG. 2 is a block diagram illustrating a method for manufacturing a decorating material with cubic effect according to an exemplary embodiment of the present disclosure.
Figure 3:
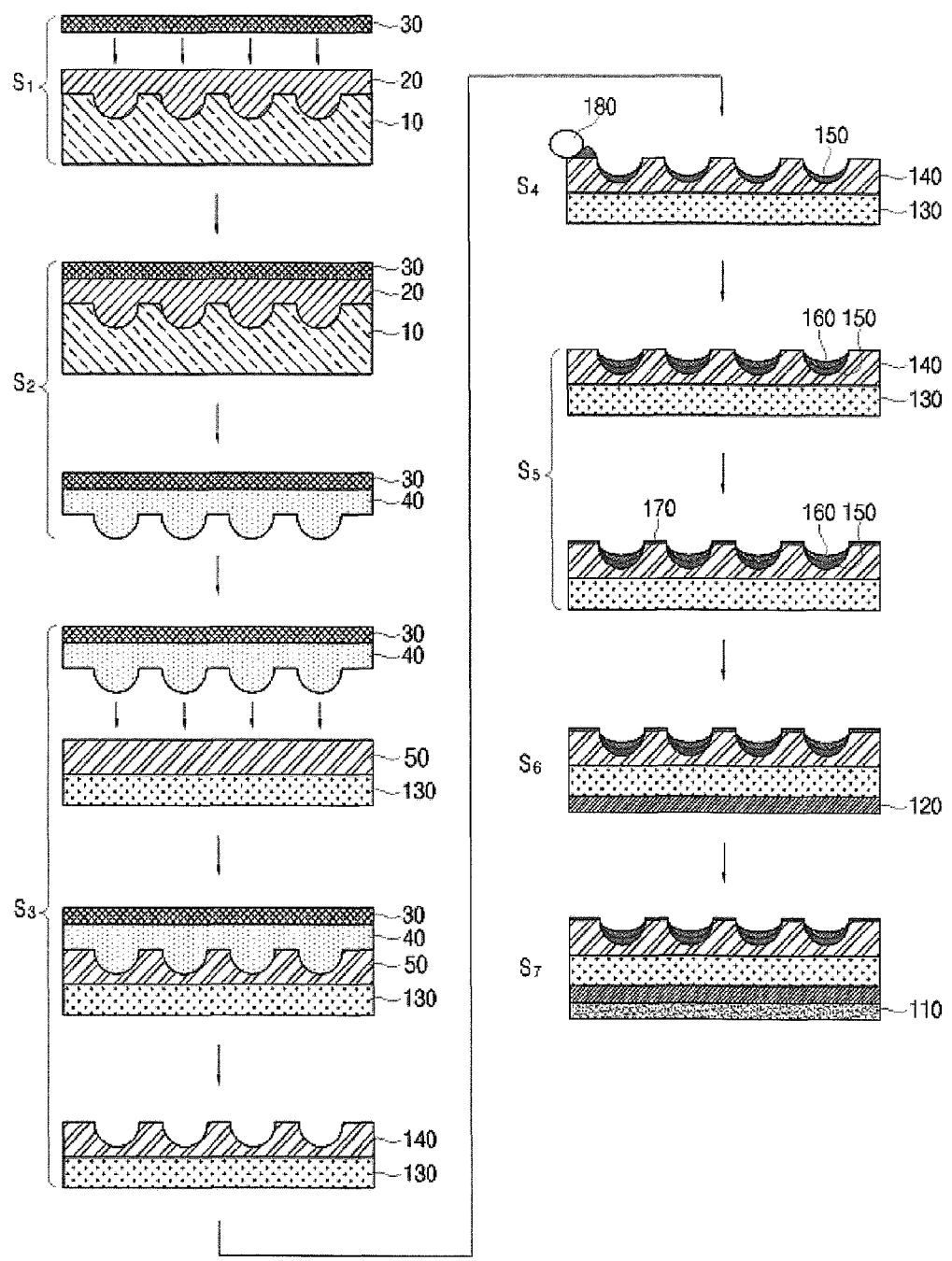
FIG. 3 is a cross-sectional view illustrating a process for manufacturing a decorating material with cubic effect that corresponds to that of FIG. 2.

FIG. 2 is a block diagram illustrating a method for manufacturing a decorating material with cubic effect according to an exemplary embodiment of the present disclosure, and FIG. 3 is a cross-sectional view illustrating a process for manufacturing a decorating material with cubic effect that corresponds to that of FIG. 2.

Referring to FIGS. 2 and 3, first of all, a master mold 10 is prepared (S1). Successively, the master mold 10 is utilized to manufacture a soft mold 40 (S2). To be more specific, the master mold 10 formed with a pattern to be manufactured is coated with ultraviolet curing mold resin 20. Thereafter, the ultraviolet curing mold resin 20 is adhered by a support body 30. The support body 30 is pressed in the master 10 direction, and irradiated with ultraviolet to form a soft mold 40 by curing the ultraviolet curing mold resin 20. Then, the soft mold 40 is separated from the master.

Now, the soft mold 40 is used to manufacture a form (S3). To be more specific, a substrate 130 is coated with pattern ultraviolet curing resin 50 to which the soft mold 40 is pressed and irradiated with ultraviolet. Then, the pattern ultraviolet curing resin 50 is cured to form a resin layer 140 formed with an intaglio pattern, and the resin layer 140 is separated from the soft mold 40 to manufacture a form.

Furthermore, a paste containing metal substance or an ink is coated on a concave portion of a convexo-concave pattern, using a coater (180. bar coater) or gravure coater (S4). A UV resin layer 140 cured by ultraviolet is used by, in most cases, a UV resin having an excellent release force (albeit, inferior printability) in consideration of releaseability from the soft mold 40. At the same time, in a case the print coater 180 is a bar or a comma coater (similar to bar coater to define an automation of bar coater, and hereinafter, it should be defined that the bar coater may be also used as a comma coater), a plain surface portion lacks coating due to a sill between the plain surface portion and the pattern portion based on the printed direction of the resin layer 140 whereby penetration is high, while the pattern portion is filled with ink, as shown in the figures.

However, in case of gravure coater, the coatability is improved by pressure of a printing roll to greatly reduce the penetration portion. Using these methods, reflection and penetration of light are adjusted to improve various metallic color feelings, textures and 3D feeling of the pattern portion.

Preferably, the metallic paste or ink material contains aluminum paste and nitro-cellulose. At this time, heat curing or natural drying is performed at 60° C. for about 5 to 10 minutes to cure the metallic paste. The opaque ink is coated on a metallic film 150 that is formed by this process (S5). The material for the opaque film preferably includes one or more of carbon black, modified acryl, polyester resin and additive.

The process of forming the opaque layer may include, for example, the method using the black ink as mentioned in the above, and also include a method of attaching the opaque film using lamination. To be more specific, the opaque film is an opaque film such as a PVC film or a PET film attached by additive or glue agent, and may use any plastic film provided in a sheet. Furthermore, the opaque layer may be formed with black ink and may be laminated with opaque film thereon. This is to compensate a disadvantage in a case the coating of the black ink is incomplete (that is, in a case there is a non-coated portion on which the ink is not coated).

Furthermore, heat curing or natural drying is performed at 60° C. for about 5 to 10 minutes to cure the opaque ink to form an opaque film 160. At this time, a process may be further provided for coating an opaque ink 170 on the plain surface portion where the convexo-concave pattern of resin layer 140 is not formed. Preferably, the coating process of the plain surface portion uses the gravure coater. Furthermore, the steps of S4 and S5 preferably use selecting one of bar coater and gravure coater and keep using one of the two. For example, only the bar coater is preferably used for where the plain surface portion is not coated from S4 to S5, and a gravure coater is preferably used for where the plain surface portion is coated from S4 to S5. Although the method of using coater has been described in the present embodiment, all wet coating methods capable of printing inclusive of silk screen printing may be used.

Furthermore, in the steps of S4 and S5 where the convexo-concave pattern has a protruder, it is preferable that the convexo-concave pattern is made to face downward to coat the metallic film and the opaque film. The reason is to make a coated layer of the protruder grow thicker, nearing the center, and to make coated layer of the protruder grow thinner, approaching the margin.

Then, PSA 120 is coated under the substrate 130 (S6), and a glass layer 110 is adhered under the PSA 120 (S7). At this time, the glass layer 110 may be used in a film type instead of the glass layer 110 being adhered. In a case the glass layer 110 is used in the film type, durability and reliability for surface must be considered by applying hard coating.

Figure 4:
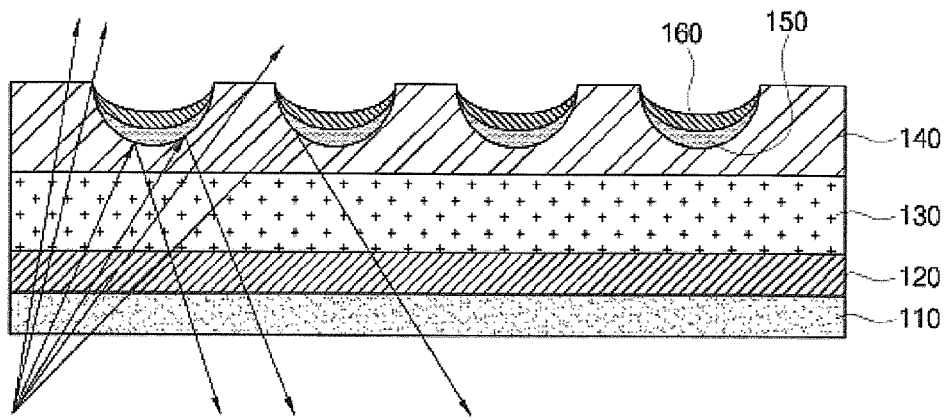
FIG. 4 is a cross-sectional view illustrating a decorating material with cubic effect manufactured according to an exemplary embodiment of the present disclosure.

FIG. 4 is a cross-sectional view illustrating a decorating material with cubic effect manufactured according to an exemplary embodiment of the present disclosure.

Referring to FIG. 4, the metallic film 150 and the opaque film 160 grow thicker nearing the center of the convex portion, and a surface of the plain surface formed with no convexo-concave pattern is exposed.

As a result, light may pass through the plain surface, and may also pass through the thin portions (hereinafter referred to as "light penetration unit") of the metallic film 150 and the opaque film 160 at the margin of the concave portion. At this time, the margin is defined as a portion covering more than half of each distal end from the center of the concave portion.

Furthermore, the light penetration unit may be divided into two parts, that is, a complete light penetration unit that completely allow the light to pass and a light opaque (semi-transparent) unit that does not completely allow the light to pass therethrough. The opaque unit may be formed only with the metallic film 150, and may be formed with the metallic film 150 and the light opaque film 160.

Furthermore, the complete light penetration unit refers to a portion where the metallic film 150 and the opaque film 160 grow narrowed, in nearing the margin of the concave portion, thereby allowing amount of light to be increased. Preferably, the metallic film 150 includes materials containing aluminum paste and nitro-cellulose, where the thickness of the metallic film may be 1 μm or above, or less than 10 μm, and the transmittance may be adjusted to 0% to 20% as the thickness increases.

Still furthermore, it is preferable that the opaque film 160 be formed with carbon black (or black pigment), or black dye and modified acryl, where the thickness of the light opaque film may be 1 μm or above but less than 15 μm, and the transmittance may be adjusted to 0% to 10% as the thickness increases.

As a result, an entire metallic feeling can be enlivened due to brightness by the light penetration unit and reflected influence of the metallic film, and the shade difference can be increased over the prior art. Furthermore, an enhanced 3D feeling can be experienced due to a light path difference resultant from viewing angles.

Still furthermore, textures and colors can be differently felt based on viewing angles, and the 3D feeling can be further increased according to reflectivity and transmittance between the resin layer 140 and the metallic film 150. Particularly, adjustment of thickness and deposition area can further create various effects.

Figure 5:
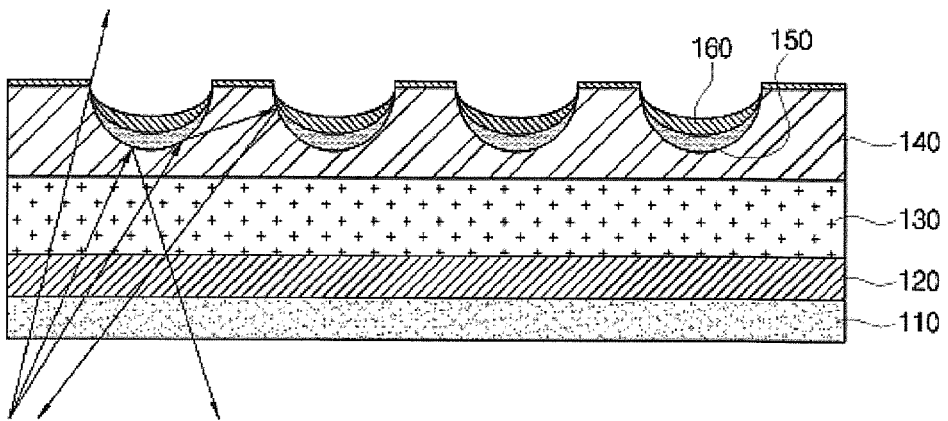
FIG. 5 is a cross-sectional view illustrating a decorating material with cubic effect manufactured according to another exemplary embodiment of the present disclosure.

FIG. 5 is a cross-sectional view illustrating a decorating material with cubic effect manufactured according to another exemplary embodiment of the present disclosure.

FIG. 5 is same as FIG. 4 except that a light opaque layer 170 is further coated on the plain surface of the structure in FIG. 4. As a result, even though the transmittance decreases over that of the exemplary embodiment of FIG. 4, the 3D feeling can be enhanced by formation of the light penetration unit.

Figure 6:
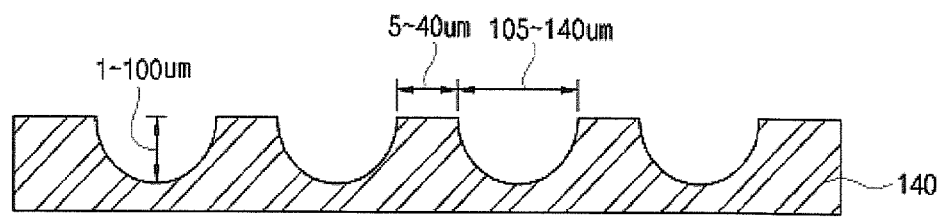
FIG. 6 is a cross-sectional view illustrating a type of a convexo-concave pattern formed on a resin layer according to the present disclosure.

FIG. 6 is a cross-sectional view illustrating a type of a convexo-concave pattern formed on a resin layer according to the present disclosure.

Referring to FIG. 6, preferably, the depth of the convex portion or the concave portion is 1 μm or above but less than 100 μm, while the pitch is 1 μm or above but less than 300 μm, where the pitch is defined by a sum of illustrated areas of 5~40 μm and 105~140 μm.

Now, in order to explain the 3D feeling of the decorating material according to the present disclosure, a standard for measuring the 3D feeling will be defined and each physical property will be analyzed.

[Basic Measurement Principle]: Measuring Equipment—Konica Minolta CM512M3

First of all, the measurement principle is evaluated on the base of the fact that L* value at 25 degrees and L* value at 75 degrees and reflectivity difference are great if the 3D feeling is high through three types of measurement modes of colorimeter, and if there is no 3D feeling, the difference comes to be small.

Secondly, if the difference is great between a view at 25 degrees and a view at 75 degrees, the 3D feeling can be further experienced (the difference of L* value based on viewing angles means the shade difference, such that the shade difference can be felt for a 3D feeling when a visual field is rotated).

Thirdly, in view of the fact that the L* value difference can be conspicuously exposed based on the viewing angles in case of background, a larger gap can be shown over the pattern, and therefore, it is preferable that the difference between the patterns be used as a yardstick for analysis.

Analysis of Test Result

| | | Colorimeter | | | | | |
|---|---|---|---|---|---|---|---|
| Point | Angle | L* (D65) | a* (D65) | b* (D65) | 550 nm | L* | Reflectivity Difference |
| 1 | 25 | 98.24 | −0.52 | −0.17 | 95.84 | 0.00% | 0.00% |
|   | 45 | 81.65 | −0.2 | 0.5 | 67.36 | −12.82% | −29.72% |
|   | 75 | 51.44 | −0.38 | −0.24 | 19.64 | −47.64% | −79.51% |
| 2 | 25 | 93.35 | 0.03 | 2.33 | 84.08 | 0.00% | 0.00% |
|   | 45 | 82.4 | −0.27 | 0.18 | 61.12 | −11.73% | −27.31% |
|   | 75 | 52.72 | −0.09 | −0.28 | 20.72 | −43.52% | −75.36% |
| 3 | 25 | 94.26 | −0.24 | 1.19 | 86.2 | 0.00% | 0.00% |
|   | 45 | 87.57 | 0 | 1.35 | 71.31 | −7.10% | −17.27% |
|   | 75 | 53.23 | −0.55 | −0.96 | 21.33 | −43.53% | −75.37% |
| 4 | 25 | 100.93 | −0.44 | 0.25 | 102.8 | 0.00% | 0.00% |
|   | 45 | 88.02 | 0 | 1.24 | 72.22 | 12.79% | −29.75% |
|   | 75 | 53.34 | −0.28 | 0.05 | 21.34 | −47.15% | −79.24% |

Referring to the test result, it can be noted that each of the L* values is different as a result of measurement analysis of four point patterns, except that there may occur an error according to measurement directions.

Because there are differences in the L* values, it can be noted that 3D feelings can be generated by the shade difference even if an object is viewed from the front. Furthermore, the 3D feelings can be experienced due to generation of differences in L* values based on viewing angles. It can be also noticed that the gray contrast from white to black is great as the differences in L* values are increased.

For reference, L*=(75-degree L*value−25-degree L*value)/25-degree L*value.

The following Table 1 shows a transmittance difference in a case similar colors are implemented in the conventional decorating material structure (comparative example) and the exemplary embodiments of the present disclosure, where the structure of FIG. 4 of the present disclosure is defined as the first exemplary embodiment, and the structure of FIG. 5 is defined as the second exemplary embodiment.

TABLE 1

| | Haze | T.T | L* | a* | b* | Reflectivity (550 nm) |
|---|---|---|---|---|---|---|
| comparative example | 87.98 | 4.38 | 62.53 | −0.71 | 1.32 | 31.14 |
| First exemplary embodiment | 77.78 | 0.19 | 70.84 | −0.79 | 2.35 | 42.2 |
| Second exemplary embodiment | 100 | 0 | 75.39 | −2.3 | 0.41 | 49.42 | where L, a and b refers to colors defined by CIE (Commission Internationale d'Eclairge), the haze defines the blurred degree, T.T defines the transparency degree, and L* defines degree of brightness as a shade.

Furthermore, "a" defines a scope from green to red, where "a" approaches green as it nears to +, and "a" approaches red as it nears to −.

"b" defines a scope from blue to yellow, where "b" approaches blue as it nears to +, and "b" approaches yellow as it nears to −.

Referring to Table 1, the difference of coating area is shown as the transmittance difference. Furthermore, the hiding power of convexo-concave pattern, i.e., the 3D feeling is created based on angles viewed through the changes of light penetration unit and difference of reflective area.

The following Table 2 shows exemplary embodiments of 3D difference and a reference value thereof in a case similar colors are implemented in the comparative example, the first exemplary embodiment and the second exemplary embodiment.

| | | Colorimeter | | | | |
|---|---|---|---|---|---|---|
| Conditions | Angle | L* (D65) | a* (D65) | b* (D65) | 550 nm | L* (3D feeling) |
| Deposition | 25 | 66.54 | 0.14 | 6.41 | 36.27 | −27.83% |
|   | 45 | 57.21 | 0.34 | 5.02 | 25.21 | |
|   | 75 | 48.02 | −0.05 | 3.52 | 16.86 | |
| First exemplary embodiment | 25 | 62.53 | −0.71 | 1.32 | 31.14 | −29.20% |
|   | 45 | 53.25 | −0.68 | 0.24 | 21.3 | |
|   | 75 | 44.27 | −0.48 | −0.19 | 14.01 | |
| Second exemplary embodiment | 25 | 71.6 | −0.73 | 2.83 | 43.32 | −33.38% |
|   | 45 | 57.43 | −0.86 | 1.84 | 25.5 | |
|   | 75 | 47.7 | −0.69 | 1.55 | 16.62 | | where L* defines the reference of 3D feeling as mentioned above. The difference in deposition and printing shows that printing methods are of the same level in the similar color or shows an excellent result.

Furthermore, the reference of 3D feeling is a quantitative value relative to a portion that is visually seen or felt as satisfactory, such that it cannot be said as being the absolute reference value (scope).

Still furthermore, the 3D reference which is L*(3D feeling)>−20%.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A decorating material for cubic effect, the material comprising:
a resin layer formed on a substrate to have a convexo-concave pattern; and
a metallic film and a light opaque film sequentially formed on a convex portion or on a concave portion,
wherein the convex portion or the concave portion is formed with a light penetration unit through which light is penetrated,
wherein the light penetration unit is formed at a margin of the convex portion or the concave portion, wherein the light penetration unit includes a first penetration unit formed with the metallic film or the metallic film and the light opaque film, and a second light penetration unit not formed with the metallic film and the light opaque film.

2. The material of claim 1, wherein the metallic film and the light opaque film grow thicker, nearing a center of the convex portion or a center of the concave portion.

3. The material of claim 1, wherein thickness of the metallic film is 1 μm or above but less than 10 μm.

4. The material of claim 3, wherein thickness of the light opaque film is 1 μm or above but less than 15 μm.

5. The material of claim 4, wherein the material of the metallic film includes Al, paste and nitrocellulose, carbon black, polyester resin, isocyanate and additive.

6. The material of claim 5, wherein the material of the light opaque film includes carbon black, modified (denatured) acryl, polyester resin and additive.

7. The material of claim 1, wherein depth of the convex portion or the concave portion is 1 μm or above but less than 100 μm, while pitch is 1 μm or above but less than 300 μm.

8. The material of claim 1, wherein the substrate is a film or a sheet formed with a material selected from a group consisting of polyethyleneterephthalene, polycarbonate, polypropylene and polymethamethylacrylate.

9. The material of claim 1, further comprising a glass layer under the substrate laminated with PSA (Pressure Sensitive Adhesive).

* * * * *